US012349237B2

United States Patent
Tian et al.

(10) Patent No.: US 12,349,237 B2
(45) Date of Patent: Jul. 1, 2025

(54) MESH WiFi DATA TRANSMISSION SYSTEM

(71) Applicant: Beken Corporation, Shanghai (CN)

(72) Inventors: Chunjian Tian, Shanghai (CN); Zhilei Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 686 days.

(21) Appl. No.: 17/456,488

(22) Filed: Nov. 24, 2021

(65) Prior Publication Data

US 2023/0141090 A1    May 11, 2023

(30) Foreign Application Priority Data

Nov. 11, 2021 (CN) .......................... 202111334382.8

(51) Int. Cl.
*H04W 88/08* (2009.01)
*H04W 84/20* (2009.01)
*H04W 88/12* (2009.01)

(52) U.S. Cl.
CPC ........... *H04W 88/08* (2013.01); *H04W 84/20* (2013.01); *H04W 88/12* (2013.01)

(58) Field of Classification Search
CPC ..... H04W 84/12; H04W 84/18; H04W 84/20; H04W 88/08; H04W 88/12
See application file for complete search history.

(56) References Cited

U.S. PATENT DOCUMENTS

| | | | | |
|---|---|---|---|---|
| 9,294,395 | B2* | 3/2016 | Mack-Crane | H04L 45/72 |
| 11,405,775 | B2* | 8/2022 | Han | H04W 40/22 |
| 2013/0188645 | A1* | 7/2013 | Mack-Crane | H04L 45/02 370/392 |
| 2013/0301553 | A1* | 11/2013 | Klein | H04W 76/12 370/329 |
| 2014/0153577 | A1* | 6/2014 | Janakiraman | H04L 49/3009 370/392 |
| 2014/0233429 | A1* | 8/2014 | Farkas | H04L 45/18 370/255 |
| 2020/0045149 | A1* | 2/2020 | Maeda | H04L 12/4633 |
| 2021/0044513 | A1* | 2/2021 | Ronen | H04L 45/122 |
| 2022/0346115 | A1* | 10/2022 | Bhanage | H04W 72/21 |

* cited by examiner

*Primary Examiner* — Liton Miah
(74) *Attorney, Agent, or Firm* — Schwegman Lundberg & Woessner, P.A.

(57) ABSTRACT

A WiFi data transmission system is provided. The transmission system is in a mesh-tree topology and includes a router and nodes connected to the router via a root node. A node of the nodes includes a station (STA) interface, a soft access point (AP) interface, a bridge interface, and a forwarding database (FDB), for example. Upon receiving a data frame by the node, the bridge interface of the node may search the FDB using information of the data frame for a latest data record to determine an outgoing interface address of the outgoing node so as to guide an outgoing path for the data frame. The structure of transmission system can lead to an improved adaptability and communications efficiency, and a reduced resource consumption.

14 Claims, 4 Drawing Sheets

MESH WiFi DATA TRANSMISSION SYSTEM

CROSS REFERENCE TO RELATED APPLICATIONS

This application claims priority to and incorporates by reference Chinese Patent Application No. 202111334382.8 filed Nov. 11, 2021.

TECHNICAL FIELD

The present application relates to a wireless data transmission system, particularly to a mesh-tree WiFi data transmission system.

BACKGROUND

WiFi data transmission systems are widely used in wireless data communications. However, some WiFi data transmission systems may consume high CPU and memory usage of IoT devices, may need to use private APIs for user applications to communicate with all the nodes, and thus may experience poor communications efficiency.

BRIEF DESCRIPTION

According to an embodiment, a mesh-tree WiFi data transmission system may comprise a router; and nodes connected to the router via a root node, a node of the nodes comprising a station (STA) interface, a soft access point (AP) interface, a bridge interface, and a forwarding database (FDB), wherein upon receiving a data frame by the node, the bridge interface performs an update search in the FDB using information of the data frame for an existing data record to determine whether to update the existing data record or create a new data record to save incoming information of the data frame in the FDB, and wherein upon receiving the data frame by the node, the bridge interface performs an outgoing path search in the FDB using the information of the data frame to find an outgoing interface of an outgoing node to guide an outgoing path for the data frame.

According to an embodiment, a mesh-tree node may comprise a node in a WiFi data transmission system with a mesh-tree topology, the node comprising: a station (STA) interface; a soft access point (AP) interface; a bridge interface; and a forwarding database (FDB) to guide an outgoing path for a data frame received by the node, wherein the data frame is in 802.11 format in a medium, and comprises: a MAC receiving address (RA) header, a MAC transmission address (TA) header, a MAC destination address (DA) header, and a MAC source address (SA) header, wherein the FDB comprises: a MAC address field, an interface identification (ID) field, and an aging field, and wherein the bridge interface performs an outgoing path search in the FDB using information of the data frame to determine an outgoing path for the data frame.

According to an embodiment, a method of transmitting a data frame in a WiFi data transmission system with a mesh-tree topology, wherein the system comprises a router and nodes connected to the router via a root node, wherein a node of the nodes comprises a station (STA) interface, a soft access point (AP) interface, a bridge interface, and a forwarding database (FDB), wherein the data frame is in 802.11 format in a medium and comprises a MAC receiving address (RA) header, a MAC transmission address (TA) header, a MAC destination address (DA) header, and a MAC source address (SA) header, and wherein the FDB comprises a MAC address field, an interface identification (ID) field, and an aging time field, the method may comprise: upon receiving the data frame by the node, performing by the bridge interface an outgoing path search in the FDB using information of the data frame for an outgoing path for the data frame; upon receiving the data frame by the node, performing by the bridge interface an update search in the FDB using the information of the data frame to find an existing record associated with the data frame; if no existing record being found by the update search in the FDB, adding by the bridge interface a new record associated with the data frame into the FDB; and if the existing record being found by the update search in the FDB, updating by the bridge interface the existing record in the FDB.

According to an embodiment, a system may comprise: a memory that stores instructions; and one or more processors configured by the instructions to perform operations comprising: upon receiving a data frame by a node, performing by a bridge interface of the node an outgoing path search in a forwarding database (FDB) of the node using information of the data frame for an outgoing path for the data frame; upon receiving the data frame by the node, performing by the bridge interface an update search in the FDB using the information of the data frame to find an existing record associated with the data frame; if no existing record being found by the update search in the FDB, adding by the bridge interface a new record associated with the data frame into the FDB; and if the existing record being found by the update search in the FDB, updating by the bridge interface the existing record in the FDB.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section. The following are the definitions of some abbreviations and acronyms used in the description:

SoftAP or AP: Soft Access Point;
API: Application Programming Interface;
STA: Station;
RA: Receiving Address;
TA: Transmitting Address;
DA: Destination Address;
SA: Source Address;
FDB: Forwarding Database;
AID: Association ID;
PC: Personal Computer;

Without loss of generality, reference will be made to illustrative embodiments by taking a method of transmitting a data frame using a mesh-tree WiFi data transmission system as example. Those of ordinary skills in the art understand that this is only to describe the application clearly and adequately, rather than limit the scope of the application, which is defined by the appended claims.

Figure 1:
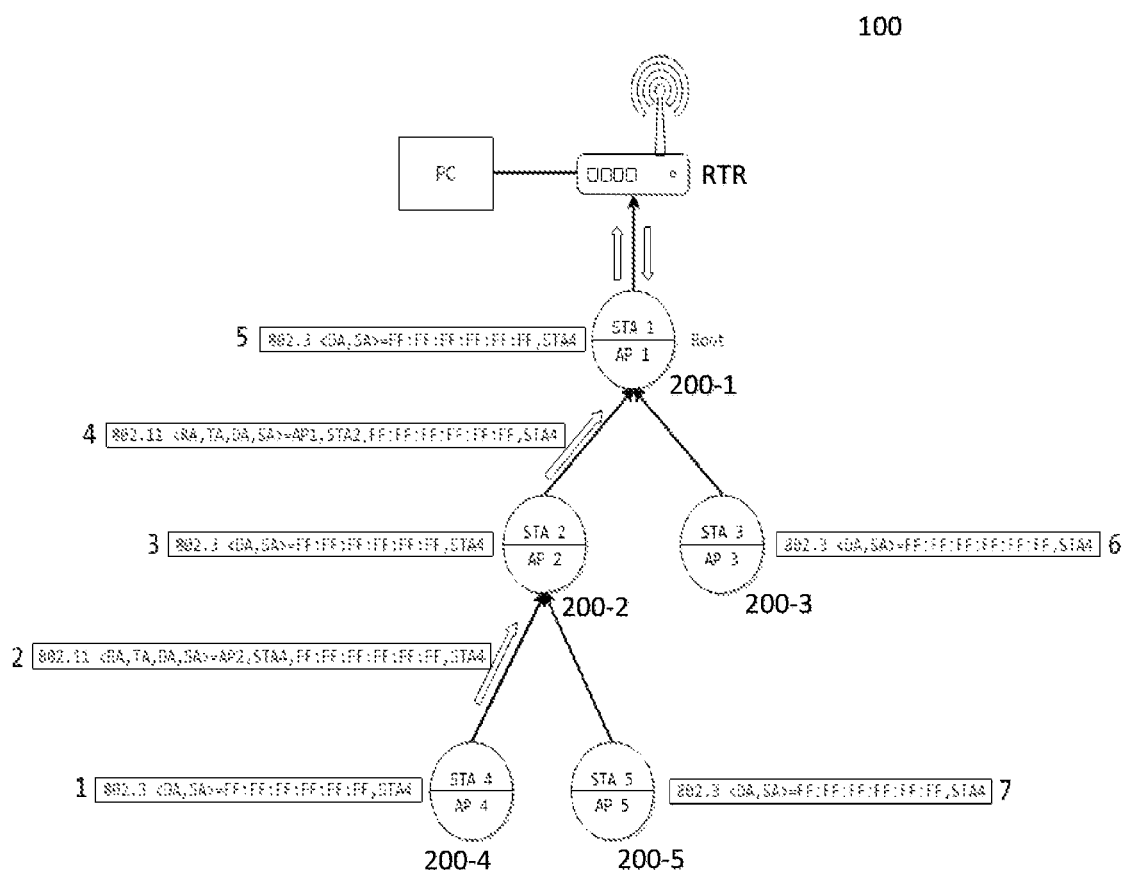
FIG. 1 is a diagram illustrating a WiFi data transmission system according to an embodiment.

FIG. 1 is a diagram illustrating a WiFi data transmission system 100 according to an embodiment. The WiFi data transmission system 100 may be in a mesh-tree topology. The WiFi data transmission system 100 may include a router (RTR), and multiple nodes (e.g., 200-1, 200-2, 200-3, 200-4, and 200-5) connected to the router (RTR) via a root node (e.g., 200-1).

Figures 2, 3:
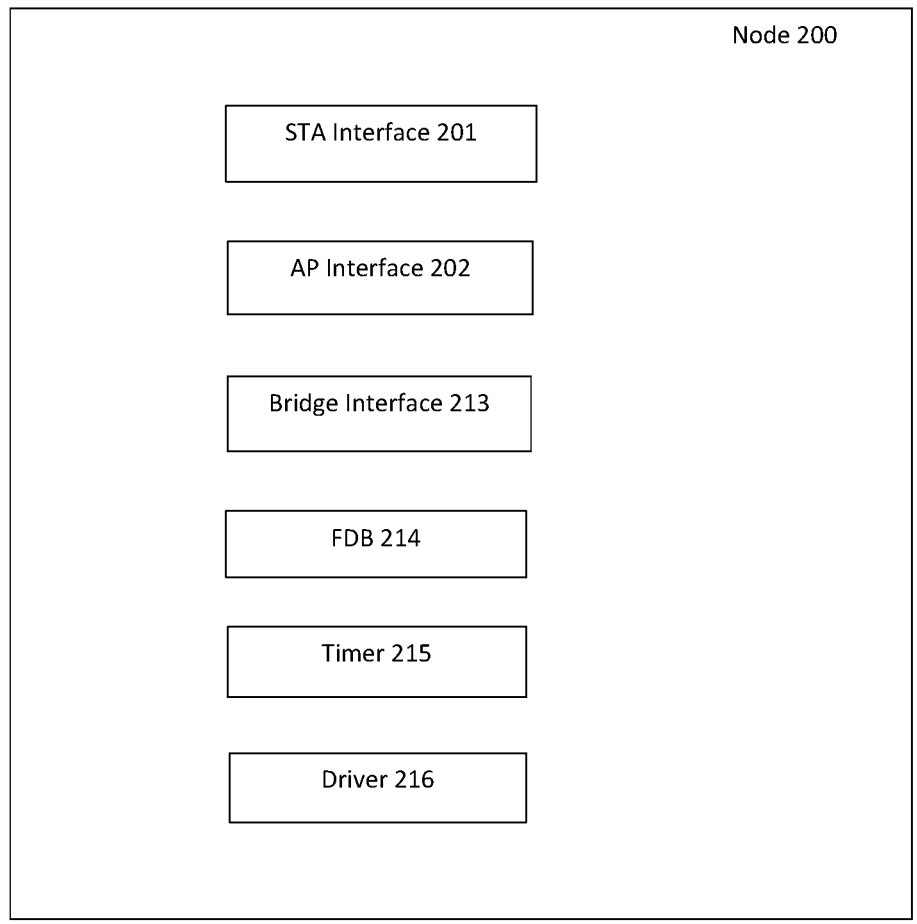
FIG. 2 is a diagram illustrating a node in a WiFi data transmission system according to an embodiment.
FIG. 3 is a diagram illustrating a forwarding database in a node according to an embodiment.

FIG. 2 is a diagram illustrating a node 200 (e.g., 200-2) of the multiple nodes (e.g., 200-1, 200-2, 200-3, 200-4, and 200-5) in the WiFi data transmission system 100 according to an embodiment. The node 200 may include a station (STA) interface 211, a soft access point (SoftAP or AP) interface 212, a bridge interface 213, a forwarding database (FDB) 214, a timer 215, and a driver 216. The AP interface 212 may include multiple ports. The node 200 of the WiFi data transmission system 100 may receive and transmit data frames (e.g., 1-7).

As shown in FIG. 1, outside the nodes 200, in the wireless media, data frames (such as data frames 2 and 4) comply with the IEEE 802.11 wireless protocol. An 802.11 wireless data frame may include four MAC headers: a receiving address (RA) header, a transmission address (TA) header, a destination address (DA) header, and a source address (SA) header.

Inside the nodes 200, data frames (such as data frames 1, 3, 5, 6 and 7) comply with the IEEE 802.3 Ethernet protocol. An 802.3 Ethernet data frame may include two MAC headers: a destination address (DA) header, and a source address (SA) header.

When a data frame is transmitted from the radio medium into a node, a wireless driver of the node will convert the format of the data frame from the 802.11 format to the 802.3 Ethernet format. And a further packet process (bridge forwarding, TCP/IP) is based on 802.3 Ethernet format. Otherwise, when a data frame is transmitted from the node into the medium, the wireless driver of the node will convert the format of the data frame from the 802.3 Ethernet format to the 802.11 format.

An example is provided below with respect to FIG. 1 to explain how the WiFi data transmission system 100 works. As shown in FIG. 1, interface AP 1 of node 200-1 receives 802.11 data frame 4 directly from interface STA 2 of node 200-2, and data frame 4 is originally from interface STA 4 of node 200-4.

When node 200-1 receives data frame 4, wireless driver will first convert frame 4 into frame 5 in 802.3 Ethernet format, then the bridge interface 213 of node 200-1 will perform an update search in the FDB 214 of node 200-1 to determine whether to update an existing data record or to create a new data record, and will perform an outgoing path search in the FDB 214 of node 200-1 to look for a latest data record to determine an outgoing path for data frame 5.

When updating or creating a data record in the FDB of a node (e.g., 200-1), the data record will record the original source information of data frame 5 indicating where data frame 5 is originally from (e.g., interface STA 4 of node 200-4), the direct incoming source information of data frame 5 indicating the previous interface of the previous node (e.g., interface STA 2 of node 200-2) that directly transmits data frame 5 to node 200-1, and a default period of time (e.g., 600 second).

In case that the update search finds an existing data record, the bridge interface 213 of node 200-1 will update a data record regarding data frame 5 in the FDB 214 of node 200-1. Otherwise, in case that the update search does not find any existing data record, the bridge interface 213 of node 200-1 will create a data record regarding data frame 5 in the FDB 214 of node 200-1. In this way, the incoming path information of data frame 5 will be recorded in the FDB 214 of node 200-1, and will be useful for a future outgoing path search for another data frame.

When processing data frame 5, the bridge interface 213 of the node 200-1 will also perform an outgoing path search in the FDB 214 of node 200-1 using the information contained in the data frame 5 for a latest data record to determine an outgoing path for the data frame 5. The latest data record found in the FDB 214 by the outgoing path search will help guide the transmission of the data frame 5. In this way, node 200-1 can determine where to transmit the data frame 5 (e.g., to transmit the data frame 5 to the outgoing interface STA 3 of the outgoing node 200-3).

FIG. 3 is a diagram illustrating a FDB 214 in a node 200 (e.g., 200-1) according to an embodiment. The FDB 214 of the node 200 may include: a first field: MAC address field 301; a second field: interface ID field 302; a third field: a flag field 303; and a fourth field: an aging time field 304. In some embodiments, the second field: interface ID field 302 is an internal identification for an interface or an association identification, for example, STA 1's interface ID is 1, AP 1's interface ID is 2, AID_STA2's ID is 1. It is noted that the STA 1's id and AID_STA2's id maybe the same, which means a flag is needed to distinguish them; for each STA connected to AP, each STA connected to AP have different association id. AP's wireless driver maintains each STA's information, such as STA's MAC address, association id, and other information, which means if a bridge wants to send data to STA 2, bridge only needs to specify the association id of STA 2, the construction of IEEE 802.11 frame is the wireless driver's responsibility, for example, the RA address is set to STA 2's MAC address, TA is set to AP's MAC address, SA and DA are set from the IEEE 802.3 frame.

The update search and the outgoing path search in the FDB 214 of a node (e.g., 200-1) utilize different methods. In some embodiments, the update search and the outgoing path search utilize the FDB 214 of node (e.g., 200-1) in different ways.

When performing an update search, the first field: MAC address field 301 represents a source address (SA) header (e.g., MAC_STA4). The second field: interface ID field 302 represents an interface id or association id (e.g., AID_STA2, wireless driver knows it). The third field: flag field 303 represents whether the STA interface or a port of the AP interface of the node is used to receive or transmit a data frame, e.g., 0=the STA interface is used, or 1=a port of the AP interface of the node is used. The fourth field: aging time field 304 represents the remaining time for the data record. Once the data record is updated or created, the value of the aging time will be set to a default value (e.g., 600 second), and the value will reduce at a constant speed until to zero. After the value of the aging time reaching zero, the data record will be deleted from the FDB 214 of the node 200-1.

In some embodiments, the third field: the flag field 304 is optional. The second field: interface ID field 302 can indicate that a port of the AP interface of the node is used to receive or transmit a data frame by using a sign such as "AID". For example, "AID_STA2" in a FDB 214 of node 200-1 may indicate a port of the AP interface 212 (connected to STA2 of the node 200-2) of node 200-1 is used to receive or transmit a data. The AP interface 212 of node 200-1 may have multiple ports respectively connected to multiple STA interfaces of nodes (e.g., 200-2, 200-3).

To create or update the data record regarding the data frame 5 in the FDB 214 of the node 200-1, the original incoming source information (e.g., the address of the interface STA 4 of the node 200-4) of the data frame 5 is saved in the MAC address field 301 (the first field), and the direct incoming interface id information (e.g., the association id of the interface STA 2 of the node 200-2, the wireless driver knows the association id) of the data frame 5 is saved in interface ID field (the second field).

In this way, the FBD 214 of node 200-1 can save and keep the original incoming source information and the direct incoming source information of a data frame for a default period of time to help trace where the data frame is originally from and directly from.

When performing an outgoing path search, the first field: MAC address field 301 represents a destination address (DA) (e.g., MAC_STA3). The second field: interface ID field 302 represents an interface ID (e.g., AID_STA2). The fourth field: aging time field 304 represents the remaining time for the data record.

For example, when performing an outgoing path search for data frame 5 in FDB 214 in node 200-1, the first field: MAC address field 301=a destination address (DA) (e.g., MAC_STA3) is used as the key to do the search. In case that a search result is found, the second field: interface ID field 302=association id of STA2 (AID_STA2) will be determined as the receiving address for node 200-1 to transmit the data frame 5. Then frame 5 will be converted into 802.11 format frame, whose DA=frame 5's DA, SA=frame 5'SA, TA=AP 1's MAC address, RA=AID_STA2's MAC address (wireless driver knows STA2's MAC address according to association id AID_STA2). Zero or one record can be found since the MAC address is the only one primary key.

In case that no search result is found, node 200-1 will broadcast the data frame 5 to all the nodes of the system 100. It is noted that frame 5 will be converted to 802.11 format by the wireless driver before being transmitted to the medium.

In this way, based on the search result of the outgoing path search, the node 200-1 can determine where to send the received data frame 5.

FIG. 1 illustrates an example of guiding transmission of data frames using the WiFi data transmission system 100 according to an embodiment.

As shown in FIG. 1, for example, data frame 1 in node 200-4 is in the 802.3 Ethernet format: 802.3<DA, SA>=FF: FF; FF: FF: FF; FF:, ST4, which indicates that data frame 1 originally from the STA4 interface of node 200-4 is to be broadcasted to all other nodes. <DA>=FF: FF; FF: FF: FF; FF: indicates that the destination of data frame 1 is all other nodes (e.g., 200-1, 200-2, 200-3 and 200-5) in the system 100 via broadcasting. <SA>=ST4 indicates that the original source of data frame 1 is ST4 interface of node 200-4.

Data frame 2 outside nodes is in the 802.11 format: <RA, TA, DA, SA>=AP2, ST4, FF: FF; FF: FF: FF; FF:, ST4. <RA>=AP2 indicates the receiving address of data frame 2 is AP2 interface of node 200-2). <TA>=ST4 indicates the transmission address of data frame 2 is ST4 interface of node 200-4. <DA>=FF: FF; FF: FF: FF; FF: indicates that the destination of data frame 2 is all other nodes in the system 100 via broadcasting. <SA>=ST4 indicates that the original source of data frame 2 is ST4 interface of node 200-4.

Data frame 3 in node 200-2 is in the 802.3 Ethernet format: 802.3<DA, SA>=FF: FF; FF: FF: FF; FF:, ST4, which indicates that data frame 3 originally from the STA4 interface of node 200-4 is to be broadcasted to all other nodes. <DA>=FF: FF; FF: FF: FF; FF: indicates that the destination of data frame 3 is all other nodes in the system 100 via broadcasting. <SA>=ST4 indicates that the original source of data frame 3 is ST4 interface of node 200-4. In this case, it is noted that data frame 3 is identical to data frame 1.

Data frame 4 outside nodes is in the 802.11 format: <RA, TA, DA, SA>=AP1, ST2, FF: FF; FF: FF: FF; FF:, ST4. <RA>=AP1 indicates the receiving address of data frame 4 is AP1 interface of node 200-1). <TA>=ST2 indicates the transmission address of data frame 4 is ST2 interface of node 200-2. <DA>=FF: FF; FF: FF: FF; FF: indicates that the destination of data frame 4 is all other nodes in the system 100 via broadcasting. <SA>=ST4 indicates that the original source of data frame 4 is ST4 interface of node 200-4.

Data frame 5 in node 200-1 is in the 802.3 Ethernet format: 802.3<DA, SA>=FF: FF; FF: FF: FF; FF:, ST4, which indicates that data frame 5 originally from the STA4 interface of node 200-4 is to be broadcasted to all other nodes. <DA>=FF: FF; FF: FF: FF; FF: indicates that the destination of data frame 5 is all other nodes in the system 100 via broadcasting. <SA>=ST4 indicates that the original source of data frame 5 is ST4 interface of node 200-4. In this case, it is noted that data frame 5 is identical to data frame 1.

When a node (e.g., 200-1) receives a data frame (e.g., 4) from an incoming node (e.g., 200-2), the wireless driver of the node will convert its format from 802.11 to 802.3 format for the bridge of the node to process, the bridge interface 213 of the node (200-1) will record an original source information (e.g., STA 4 of node 200-4) of the data frame (e.g., 5) to identify the original source of the data frame (5), and an incoming source information (e.g., interface STA 2 of node 200-2) of the data frame (4) to identify an interface (e.g., STA 2) of an incoming node (e.g., node 200-2) that directly transmits the data frame (5) to the node (200-1), and the bridge interface 213 of the node (200-1) thus will create or update a data record or entry regarding the data frame (5) in the FDB 214 of the node (200-1).

The bridge interface 213 of the node (200-1) will create a new data record or entry regarding the data frame (5) in the FDB 214 of the node (200-1) using the data frame information (such as <DA, SA>) of the data frame (5) and the interface id or association id (from driver) if no existing data frame regarding the data frame (5) is found in the FDB 214 of the node (200-1). Otherwise, the bridge interface 213 of the node (200-1) will update an existing data record or entry regarding the data frame (5) in the FDB 214 of the node (200-1) the existing data frame regarding the data frame (5) is found in the FDB 214 of the node (200-1). The created or updated data record will remain in the FDB 214 of the node (200-1) for a default period of time (e.g., 600 seconds).

The bridge interface 213 of the node (200-1) will search the FDB 214 in the node (200-1) using the data frame information (such as <DA, SA>) of the data frame (5) in order to find an existing record in the FDB 214 to guide an outgoing path to transmit the data frame (5).

When adding or updating a new data record or entry regarding the data frame 5 in the FDB 214 of the node 200-1, the MAC address field of the FDB 214=SA from the data frame 5 (e.g., STA 4, indicating that the original source of the data frame 4 is STA 4 interface of the node 200-4), and the Interface ID field of the FDB 214=association id (from the wireless driver's information) (e.g., AID_STA2, indicating that the incoming source of the data frame 4 is interface STA 2 of the node 200-2).

When searching in the FDB 214 of the node 200-1 for an existing data record regarding the data frame 5, the MAC address field of the FDB 214=DA from the data frame 5 (e.g., FF: FF: FF: FF: FF: FF:, indicating that the destiny of the data frame 5 is every node via broadcasting) can be used as a key to do the search. Supposed that an existing record associated with the data frame 5 is found, the Interface ID field of the found record will be used to specify the outgoing interface for the data frame 5.

For example, if the Interface ID field of the found record=AID_STA3 is found, the bridge interface 213 of the node 200-1 will guide the data frame 5 to be transmitted to the interface STA 3 of the node 200-3 via AP1.

In this way, the bridge 213 of the node 200-1 may search the FDB 214 using the information (such as <DA, SA>) contained in the data frame 5 to obtain an existing record in the FDB 214, and may use the Interface ID field of the existing record (e.g., AID_STA3) to guide the transmission of the data frame 5 (e.g., transmitting the data frame 5 to the node 3) via AP 1's port AID_STA3.

An example table 1 for FDB 214 of node 200-1 is shown below. The FDB 214 of node 200-1 can be used to record incoming path information of data frames, and can also be used to find outgoing path information for data frames. Both an update search and an outgoing path search can be performed in the FDB 214 of node 200-1. The update search is performed for the purpose of updating or creating a data record in the FDB 214 of node 200-1. The outgoing path search is performed for the purpose of finding an outgoing path for the received data frame. The update search and the outgoing path search are carried out in different ways.

| MAC address | Interface ID | Aging time |
| --- | --- | --- |
| MAC_STA4 | AID_STA2 | 600 |
| MAC_STA5 | AID_STA2 | 350 |
| MAC_PC | STA1 | 500 |
| MAC_Router | STA1 | 500 |
| MAC_STA3 | AID_STA3 | 500 |

Example Table for FDB 214 of Node 200-1

For the first data record, after performing the update search in FDB 214 of node 200-1, MAC address=MAC_STA4 indicates that the original incoming source of the data frame is interface STA4 of node 200-4, Interface ID=AID_STA2 indicates the data frame is received from interface STA2 of node 200-2 via a port of AP interface of node 200-1, and Aging time=600 indicating that the first data record is newly created or updated.

For the second data record, after performing the update search in FDB 214 of node 200-1, MAC address=MAC_STA5 indicates that the original incoming source of the data frame is interface STA5 of node 200-5, Interface ID=AID_STA2 indicates the data frame is received from interface STA2 of node 200-2 via a port of AP interface of node 200-1, and Aging time=350 indicating that the second data record was created or updated 250 (600-350) seconds ago.

For the third data record, after performing the update search in FDB 214 of node 200-1, MAC address=MAC_PC indicates that the original incoming source of the data frame is a PC, Interface ID=STA1 indicates the data frame is received via interface STA1 of node 200-1 that is connected to the PC, and Aging time=500 indicating that the third data record was created or updated 100 (600-500) seconds ago.

When performing an outgoing path search, supposed that the destination address (DA) of a data frame is known to be MAC_STA5, then MAC address=MAC_STA5 can be used a key to search the FDB 214 of node 200-1. The outgoing path search can thus find the second record with Interface ID=AID_STA2 since Aging time=350 is greater than 0. Thus node 200-1 can determine to send the data frame to interface STA2 of node 200-2 via a port of AP interface of node 200-1 that is connected to interface STA2 of node 200-2.

Figure 4:
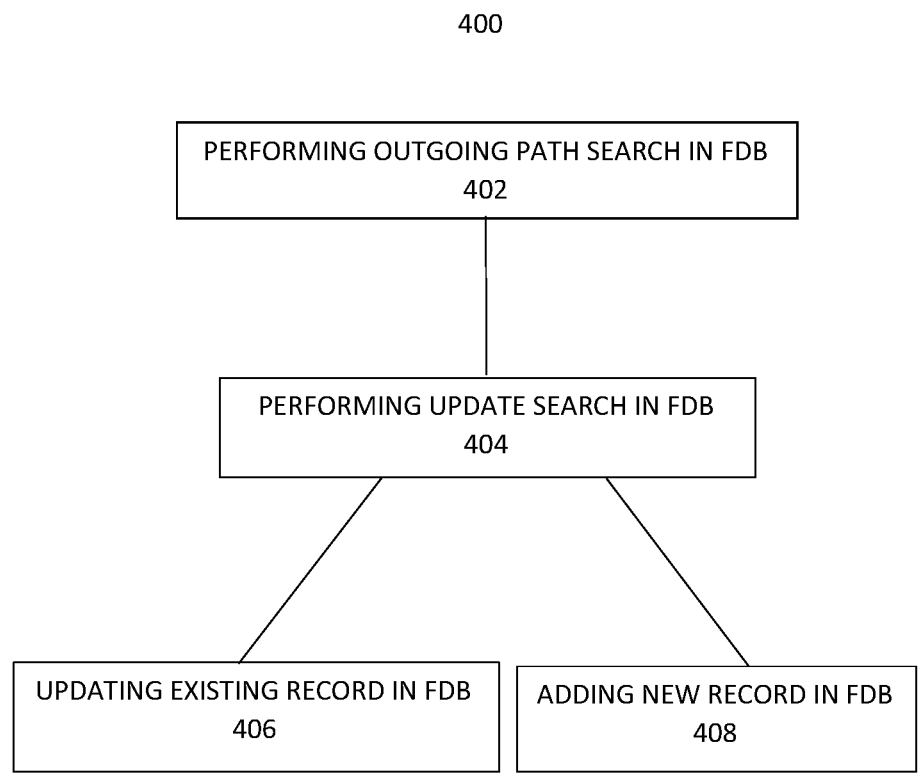
FIG. 4 is a flow chart illustrating a method of transmitting a data frame using a WiFi data transmission system according to an embodiment.

FIG. 4 is a flow chart illustrating a method 400 of transmitting a data frame using the WiFi data transmission system 100 with a mesh-tree topology according to an embodiment. As shown in FIG. 1, the system 100 may include a router (RTR) and nodes (e.g., 200-1, 200-2, 200-3, 200-4, 200-5 etc.) connected to the router RTR via a root node 200-1. As shown in FIG. 2, a node of the nodes may include a station (STA) interface 211, a soft access point (AP) interface 212, a bridge interface 213, and a forwarding database (FDB) 214. When transmitting in the medium, the data frame is in 802.11 format and includes four headers: a MAC receiving address (RA) header, a MAC transmission address (TA) header, a MAC destination address (DA) header, and a MAC source address (SA) header. When processing in the node, the data frame is in 802.3 format and includes two headers: a destination address (DA) header, and a source address (SA) header. As shown in FIG. 3, the FDB 214 of a node may include a MAC address field 301, an interface identification (ID) field 302, a flag field 303, and an aging time field 304.

In block 402, upon receiving the data frame (e.g., 2) by the node (e.g., 200-2), the bridge interface (213) performs an outgoing path search in the FDB (214) using information of the data frame for an outgoing path for the data frame.

In block 404, upon receiving the data frame (e.g., 2) by the node (e.g., 200-2), the bridge interface (213) performs an update search in the FDB (214) using the information of the data frame to find an existing record associated with the data frame.

In block 406, if no existing record being found by the update search in the FDB (214), the bridge interface (213) adds a new record associated with the data frame into the FDB.

In block 408, if the existing record being found by the update search in the FDB (214), the bridge interface (213) updates the existing record in the FDB.

In this way, upon receiving a data frame by a node, the bridge interface of a node will do an outgoing path search the FDB using information of the data frame for an existing data record to determine an outgoing interface address of the outgoing node, and thus the node will know where to transmit the data frame. Upon receiving the data frame by the node, the bridge interface of the node will also do an update search in the FDB, and will save a data record with the original incoming source information and the direct incoming source information of the data frame for future use. The structure and the utilization of transmission system can lead to an improved adaptability and communications efficiency, and a reduced resource consumption.

Figure 5:
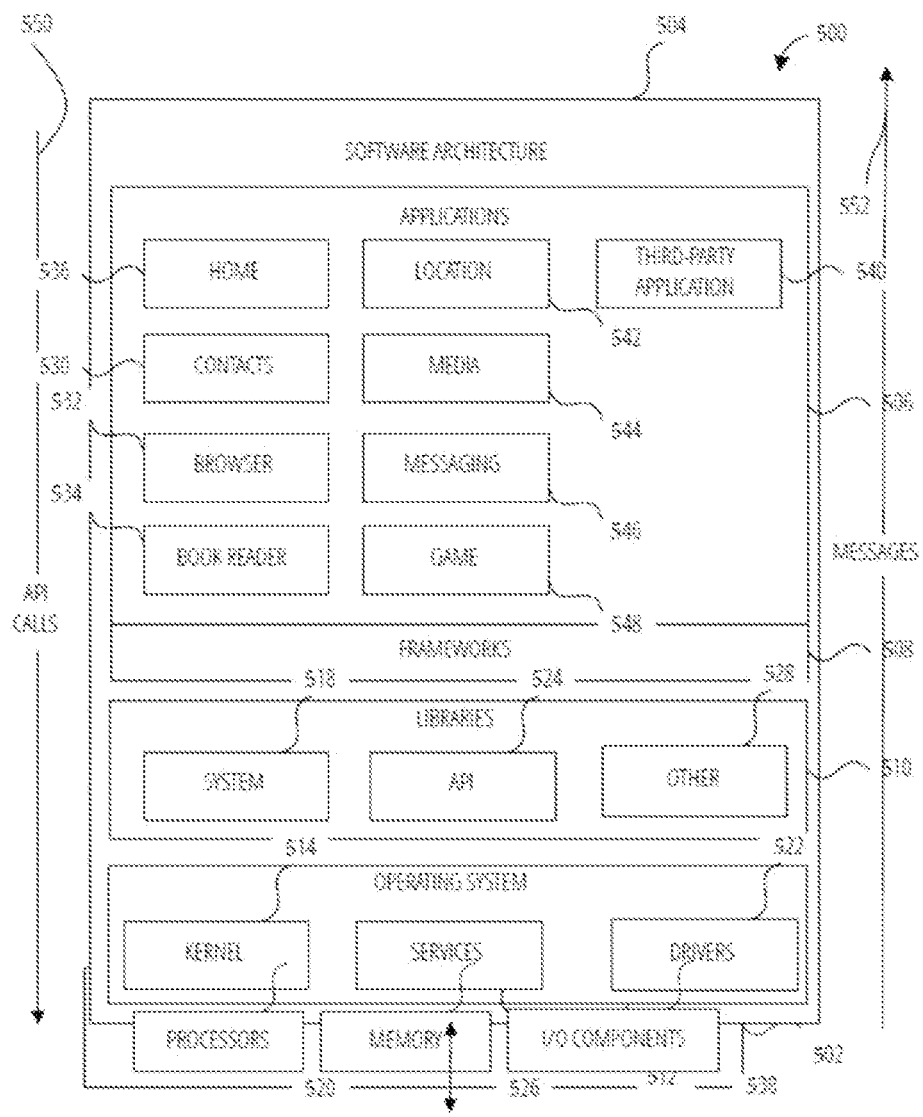
FIG. 5 is a block diagram showing a software architecture within which examples may be implemented.

FIG. 5 is a block diagram 500 illustrating a software architecture 504, which can be installed on any one or more of the devices (such as the nodes) described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A WiFi data transmission system in a mesh-tree topology comprising:
   a router; and
   nodes connected to the router via a root node, a node of the nodes comprising a station (STA) interface, a soft access point (AP) interface, a bridge interface, and a dual-purpose forwarding database (FDB), the dual-purpose FDB comprising a MAC address field, an interface identification (ID) field, and an aging field,
   wherein upon receiving a first data frame by the node, the bridge interface performs both:
     a first update search in the dual-purpose FDB using a source address (SA) of the first data frame to determine whether to update an existing data record or create a new data record to save incoming information of the first data frame in the FDB, the first update search comprising: creating a new data record or updating an existing data record to save the SA of the first data frame in the MAC address field and save an incoming interface of the first data frame in the ID field, and
     a first outgoing path search in the dual-purpose FDB using a destination address (DA) of the first data frame to find an outgoing interface of an outgoing node to guide an outgoing path for the first data frame,
   wherein upon receiving a second data frame by the node, the bridge interface performs both:

a second update search in the dual-purpose FDB using an SA of the second data frame to determine whether to update an existing data record or create a new data record to save incoming information of the second data frame in the FDB, and a second outgoing path search in the dual-purpose FDB using a DA of the second data frame to find an outgoing interface of an outgoing node to guide an outgoing path for the second data frame, the second outgoing path search comprising in response to determining that the DA of the second data frame is the same as the SA of the first data frame, guiding the second data frame to the incoming interface of the first data frame;

wherein when performing the update search in the dual-purpose FDB:
the MAC address field represents the SA of the data frame,
the ID field represents an incoming interface of an incoming node, and
the aging field is set to a default value, and wherein when performing the outgoing path search in the dual-purpose FDB:
the MAC address field represents the DA of the data frame,
the ID field represents the outgoing interface of the outgoing node, and
the aging field is used to determine a remaining duration of validity of the outgoing path.

2. The system of claim 1, wherein the first data frame or the second data frame complies with IEEE 802.11 protocol outside the node in a medium, and wherein the data frame comprises four MAC headers including:
a receiving address (RA) header,
a transmission address (TA) header,
a destination address (DA) header, and
a source address (SA) header.

3. The system of claim 1, wherein the first data frame or the second data frame complies with IEEE 802.3 protocol within the node, and comprises two MAC headers including:
a destination address (DA) header, and
a source address (SA) header.

4. The system of claim 1, wherein the FDB further comprises a flag field indicating whether the first data frame or the second data frame is via the STA interface of the node or via a port of the AP interface of the node that is connected to a STA interface of another node.

5. The system of claim 1, wherein upon performing the first update search in the FDB and finding no existing data record, the bridge interface creates the new data record associated with the first data frame in the FDB.

6. The system of claim 1, wherein upon performing the first update search in the FDB and finding the existing data record, the bridge interface updates the existing data record with a current data record associated with the first data frame in the FDB.

7. The system of claim 1, further comprising a timer to set the aging field of the FDB for the new created data record or the updated existing data record associated with the first data frame to the default value, wherein the record is to be removed from the FDB upon the aging field reaching zero.

8. A node in a WiFi data transmission system with a mesh-tree topology, the node comprising:
a station (STA) interface;
a soft access point (AP) interface;
a bridge interface; and a dual-purpose forwarding database (FDB) to guide an outgoing path for a data frame received by the node,
wherein the data frame is in 802.11 format in a medium, and comprises:
a MAC receiving address (RA) header,
a MAC transmission address (TA) header,
a MAC destination address (DA) header, and
a MAC source address (SA) header,
wherein the FDB comprises:
a MAC address field,
an interface identification (ID) field, and
an aging field,
and wherein the bridge interface performs:
a first update search in the dual-purpose FDB to save incoming information of a first data frame in the FDB, the first update search comprising: creating a new data record or updating an existing data record to save the SA of the first data frame in the MAC address field and save an incoming interface of the first data frame in the ID field;
a first outgoing path search in the dual-purpose FDB using information of the first data frame to determine an outgoing path for the first data frame;
a second update search in the dual-purpose FDB using an SA of a second data frame to determine whether to update an existing data record or create a new data record to save incoming information of the second data frame in the FDB, and
a second outgoing path search in the dual-purpose FDB using a DA of the second data frame to find an outgoing interface of an outgoing node to guide an outgoing path for the second data frame, the second outgoing path search comprising in response to determining that the DA of the second data frame is the same as the SA of the first data frame guiding the second data frame to the incoming interface of the first data frame,
wherein when performing the update search in the dual-purpose FDB:
the MAC address field represents the SA of the data frame,
the ID field represents an incoming interface of an incoming node, and
the aging field is set to a default value, and
wherein when performing the outgoing path search in the dual-purpose FDB:
the MAC address field represents the DA of the data frame,
the ID field represents the outgoing path for the data frame, and
the aging field is used to determine a remaining duration of validity of the outgoing path.

9. The node of claim 8, wherein the outgoing path for the data frame comprises an outgoing interface address of an outgoing node.

10. The node of claim 8, wherein upon receiving the data frame from the medium by the node, a driver of the node converts the data frame from 802.11 format into 802.3 format for upper layer protocol processing.

11. The node of claim 8, wherein upon performing the first update search in the FDB and no existing record associated with the first data frame being found in the FDB, the bridge adds a new record associated with the first data frame into the FDB.

12. The node of claim 8, wherein upon performing the first update search in the FDB and an existing record associated with the first data frame being found in the FDB, the bridge updates the existing record in the FDB with the aging field being set to the default value.

13. The node of claim 8, wherein upon a value of the aging field of a data record reaching zero, the record is deleted from the FDB by a driver of the node.

14. A system comprising:
a memory that stores instructions; and
one or more processors configured by the instructions to perform operations comprising:
upon receiving a first data frame by a node, performing by a bridge interface of the node both;
a first outgoing path search in a dual-purpose forwarding database (FDB) of the node using information of the first data frame for an outgoing path for the first data frame; the dual-purpose FDB comprising a MAC address field, an interface identification (ID) field, and an aging field; and
an update search in the dual-purpose FDB using the information of the data frame to find an existing record associated with the data frame;
if no existing record being found by the update search in the FDB, adding by the bridge interface a new record associated with the first data frame into the FDB, wherein saving the new record associated with the first data frame comprises saving an SA of the first data frame in the MAC address field and saving an incoming interface of the first data frame in the ID field; and
if the existing record being found by the update search in the FDB, updating by the bridge interface the existing record in the FDB, wherein updating the existing record comprises updating the SA of the first data frame in the MAC address field and updating an incoming interface of the first data frame in the ID field; and
upon receiving a second data frame by the node, performing by the bridge interface of the node;
a second outgoing path search in the dual-purpose FDB using a DA of the second data frame to find an outgoing interface of an outgoing node to guide an outgoing path for the second data frame, the second outgoing path search comprising in response to determining that the DA of the second data frame is the same as the SA of the first data frame, guiding the second data frame to the incoming interface of the first data frame,
wherein when performing the update search in the dual-purpose FDB:
the MAC address field represents a source address (SA) of the data frame,
the ID field represents an incoming interface of an incoming node, and
the aging field is set to a default value, and
wherein when performing the outgoing path search in the dual-purpose FDB:
the MAC address field represents a destination address (DA) of the data frame,
the ID field represents an outgoing interface of an outgoing node, and
the aging field is used to determine a remaining duration of validity of the outgoing path.

* * * * *